United States Patent
Mather et al.

(10) Patent No.: US 6,853,531 B2
(45) Date of Patent: Feb. 8, 2005

(54) MATERIAL PROCESSING MACHINE

(76) Inventors: Corey Alexander Mather, 106 Bridge Street, Toowomba, Queensland (AU), 4350; Mark William Gust, 210 Ruthven Street, Toowoomba, Queensland (AU), 4350

(*) Notice: Subject to any disclaimer, the term of this patent is extended or adjusted under 35 U.S.C. 154(b) by 235 days.

(21) Appl. No.: 10/188,105

(22) Filed: Jul. 3, 2002

(65) Prior Publication Data

US 2002/0171993 A1 Nov. 21, 2002

Related U.S. Application Data

(63) Continuation-in-part of application No. 09/453,095, filed on Dec. 2, 1999, now Pat. No. 6,418,004.

(30) Foreign Application Priority Data

| Dec. 2, 1998 | (AU) | PR7439 |
| Nov. 29, 2001 | (AU) | PR9174 |

(51) Int. Cl.[7] .............................................. H01H 47/00
(52) U.S. Cl. ........................ 361/179; 361/160; 361/186
(58) Field of Search ................................ 361/160, 179, 361/186; 342/42, 44, 50, 51; 241/34, 36, 37.5, 92

(56) References Cited

U.S. PATENT DOCUMENTS

| 2,913,581 A | | 11/1959 | Simonton et al. |
| 3,989,198 A | | 11/1976 | Blasko |
| 4,057,805 A | | 11/1977 | Dowling |
| 5,227,798 A | | 7/1993 | Hildebrand |
| 5,287,113 A | | 2/1994 | Meier |
| 5,667,152 A | * | 9/1997 | Mooring ..................... 241/37.5 |
| 5,669,809 A | * | 9/1997 | Townsend ................... 452/125 |
| 6,000,642 A | | 12/1999 | Morey |

* cited by examiner

Primary Examiner—Anthony Dinkins
(74) Attorney, Agent, or Firm—Hoffman, Wasson & Gitler

(57) ABSTRACT

A material processing machine such as a wood chipping machine, a press, or other machine comprising an operating region having at least one processing element, and an access region through which material passes to the operating region, has at least one passive sensor that may be worn by a user of the machine, for example, around their wrist, and at least one sensing coil mounted in the access region of the machine for detecting the presence of the passive sensor in the access region. Control circuitry responsive to the at least one sensing coil provides control signals for stopping operation of the machine, preventing start-up of the machine and/or otherwise preventing injury to the machine user.

20 Claims, 10 Drawing Sheets

MATERIAL PROCESSING MACHINE

RELATED APPLICATIONS

The instant application is a continuation-in-part based upon U.S. patent application Ser. No. 09/453,095, filed Dec. 2, 1999, now U.S. Pat. No. 6,418,004.

FIELD OF THE INVENTION

This invention relates to a material processing machine. In particular, although not exclusively, the invention relates to a material processing machine having at least one sensing coil and control circuitry to detect the presence of a machine user in or close to a danger zone of the machine and to prevent injury to the machine user.

The invention will be described by way of example with reference to a mobile wood-chipping machine and a press. However, it will be appreciated from the following description that the machine of the invention may be a material processing machine other than a mobile wood chipping machine or a press.

BACKGROUND OF THE INVENTION

Mobile wood chipping machines are used by workmen to chip branches and parts of trees into smaller pieces for providing mulch or to make the pieces of the tree more easily transportable to other locations or for easy disposal. Such machines have a feed chute leading into a chamber where chipping discs are present and the discs are driven to cause material introduced into the chamber to be shredded or chipped into small pieces. A pair of feed rollers is present at an end of the chute spaced from a feed opening into the chute. The feed rollers convey material placed into the chute towards the chipping discs. A safety bar extends across the chute in the vicinity of the feed opening. The bar is normally pulled away from the chute to cause a drive to rotate the feed rollers and is pushed towards the chute to disengage the drive.

Serious accidents have been known to occur with the use of such machines. It is usual for workmen to wear gloves and other protective clothing, and it is possible that material being fed into the chute may snare a workman. If a workman is snared by material being fed into the chute the workman may be unable to operate the safety bar in time or may be unable to operate the bar at all. As a consequence, the workman may be drawn into the machine and injured. Furthermore, the safety bar may malfunction.

Similar problems and accidents also occur with material processing machines such as presses and the like. Presses have an operative region in which, for example, sheets of material such as metal are pressed, bent or formed into a desired shape, often by a hydraulic system forcing a blade having shaped forming elements onto the material. The press also has an access region through which an operator passes the material to be pressed and retrieves the pressed material. Presses typically operate at between about 30 and 75 strokes per minute and if an operator becomes ensnared with the material being pressed and/or the machine parts, the rapid operation of the press may cause injury to the operator before the operator is able to free himself.

It is an object of the present invention to provide a safety system for machinery that overcomes, or at least ameliorates, one or more of the deficiencies of the prior art.

SUMMARY OF THE INVENTION

According to one aspect of the present invention there is provided a material processing machine comprising:

an operating region having at least one processing element in which material is processed by the at least one processing element;

an access region having at least one sensing coil, material passing to said operating region via the access region; motive means driving the at least one processing element; and control circuitry responsive to a signal from the at least one sensing coil to control at least one aspect of operation of the machine, wherein the at least one sensing coil generates the signal when at least one passive sensor carried by a user of the machine is in the access region.

The at least one passive sensor may be a tuned circuit. Preferably, the tuned circuit consists of a coil and a capacitor connected in parallel with one another. The coil may have a number of turns wound in a spiral to present a substantially flat shaped circular coil.

The at least one passive sensor may be worn by the user of the machine and is preferably incorporated in at least one item which is placed around a part of the user's body which may enter the access region. The at least one item may be one or more bands worn around the wrist(s) and/or ankle(s) of the user. Alternatively, the item may be one or more glove(s) worn on the hand(s) of the user.

Suitably, the at least one sensing coil is insulated from the machine and is placed adjacent parts of the machine capable of injuring a user of the machine.

Preferably, the at least one sensing coil is energized by the control circuitry; an electromagnetic field generated by the at least one sensing coil is modified by the close proximity of the at least one passive sensor; and in response to detection of the field modification, the control circuitry provides a control signal to control at least one aspect of the operation of the machine.

Preferably, the control signal provides a start signal in response to a first sensing coil detecting proximity of at least one passive sensor. Optionally, the start signal permits starting of the machine, but does not commence operation of the machine. Optionally, the machine commences operation if a machine starting means is activated by the user while the start signal is provided by the control circuitry.

Optionally, the first sensing coil may be located adjacent a user interface for controlling the machine.

Suitably, in response to at least one second sensing coil detecting at least one passive sensor in the access region, the control circuitry provides a control signal to the motive means to cease operation of the at least one processing element. Suitably, in response to at least one second sensing coil detecting at least one passive sensor in the access region, the control circuitry provides a control signal to block access to the operating region of the machine.

Suitably, the control circuitry provides a control signal in response to a third sensing coil not detecting a passive sensor for a predetermined period of time.

The material processing machine preferably comprises a self-test element to determine if the at least one sensing coil is operating correctly.

BRIEF DESCRIPTION OF THE DRAWINGS

In order that the invention may be more fully understood and put into practice, preferred embodiments thereof will now be described by way of example only and with reference to the accompanying drawings, wherein.

DETAILED DESCRIPTION OF THE PREFERRED EMBODIMENTS

Figure 1:
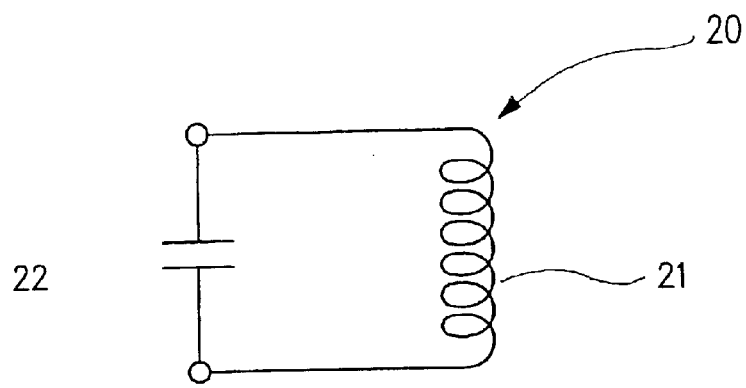
FIG. 1 is a circuit diagram of a passive sensor according to an embodiment of the invention.

FIG. 1 shows an example of a passive sensor 20. The sensor comprises a tuned circuit consisting of a coil 21 and a capacitor 22 connected in parallel with the coil. The coil may have any suitable number of turns and it is preferred that the coil be wound in a spiral fashion so that it presents a substantially flat circular profile. Alternatively, the coil may be configured as a number of turns of wire with a noncircular path.

Figure 8:
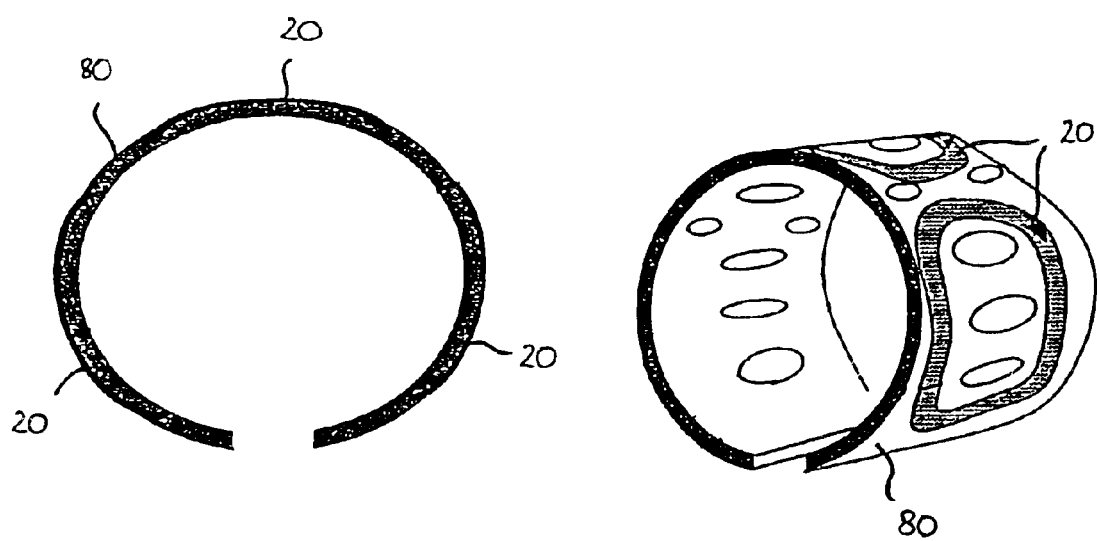
FIG. 8A is a perspective view of a band having a plurality of passive sensors incorporated therein.
FIG. 8B is an end view of the band illustrated in FIG. 8A.

Referring to FIGS. 8A and 8B, one or more of the passive sensors 20 may be incorporated in a band 80. The band 80 is preferably flexible and may be made of polycarbonate and adapted to be worn around the wrist or ankle of a machine operator or user. Depending on the material processing machine being operated, at least two such bands may be worn by the machine operator so that the presence of either hand of the operator within a danger zone of the machine can be detected. Alternatively, an operator may wear a band 80 on each of his or her wrists and ankles so that their hands and feet can be detected when they are located within a predetermined distance of a machine. Of course the passive sensors 20 need not be incorporated into a band and may be worn or otherwise carried by the operator. For example, the sensors 20 may be incorporated in gloves, helmets, boots and/or other garments to allow detection of the parts of an operator's body wearing the article or garment in a particular region of a machine.

Figure 2:
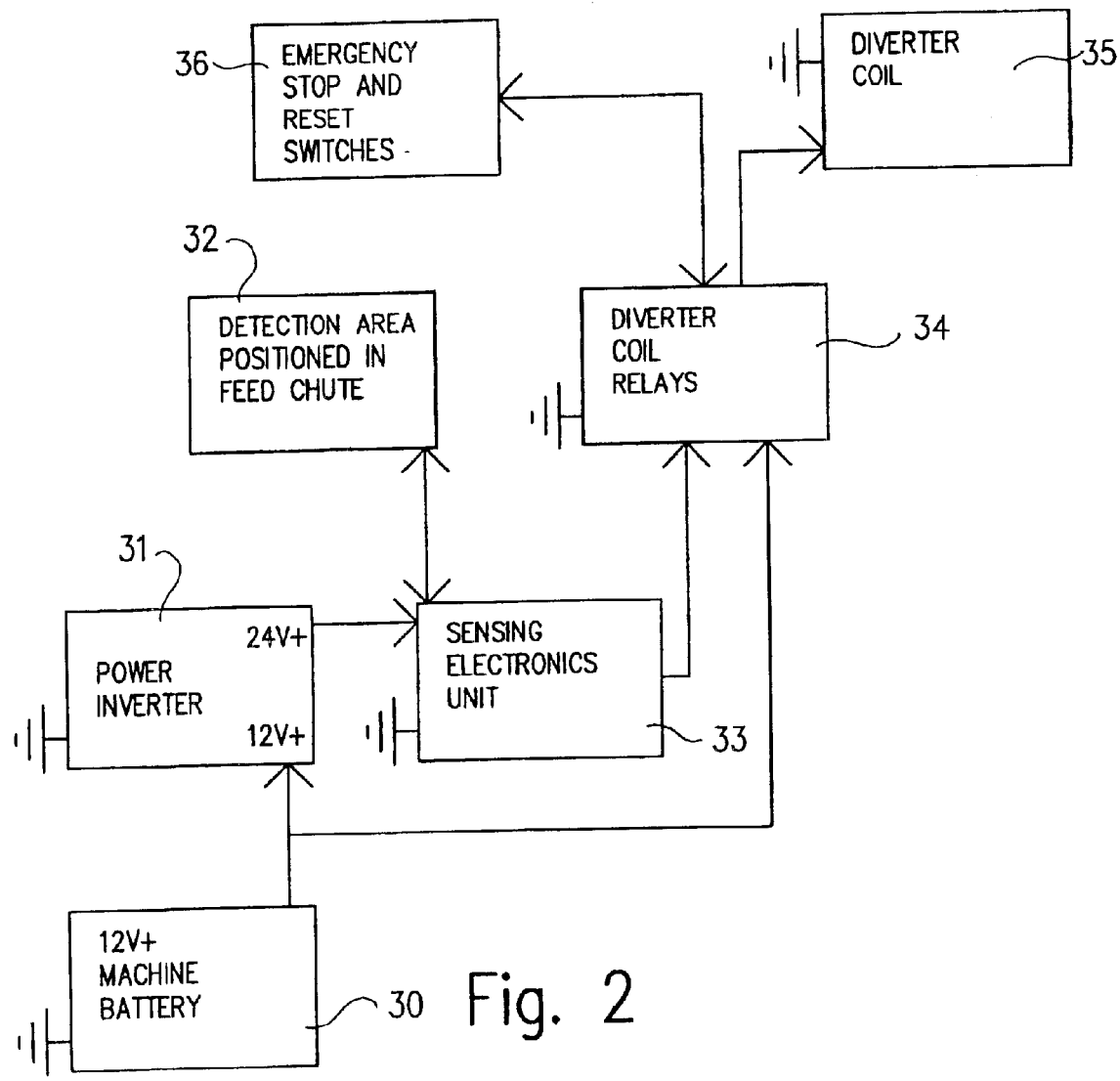
FIG. 2 is a block diagram of part of the safety system of the material processing machine of the invention.

FIG. 2 shows a block diagram of part of the safety system of the material processing machine of the invention. FIG. 2 shows a battery 30, which may typically be a battery associated with, for example, a wood chipping machine 9 (see FIGS. 6 and 7). A DC-to-DC converter 31 receives power from the battery 30 and provides a 24 VDC output for the remainder of the circuit shown in FIG. 2.

A sensor coil 32, which comprises a coil configured in a flat rectangular shape, is located in a feed chute 10 of the wood-chipping machine 9 (see FIGS. 6 and 7), and, as shown in FIG. 2, is coupled to sensing electronics unit 33. An output from electronics unit 33 is used to operate a relay 34. Relay 34 in turn allows a diverter coil 35 of the solenoid valve to be operated. This solenoid valve is part of the hydraulic circuit shown in FIG. 3. Stop and reset switches 36 are coupled to the relay 34.

Figure 6:
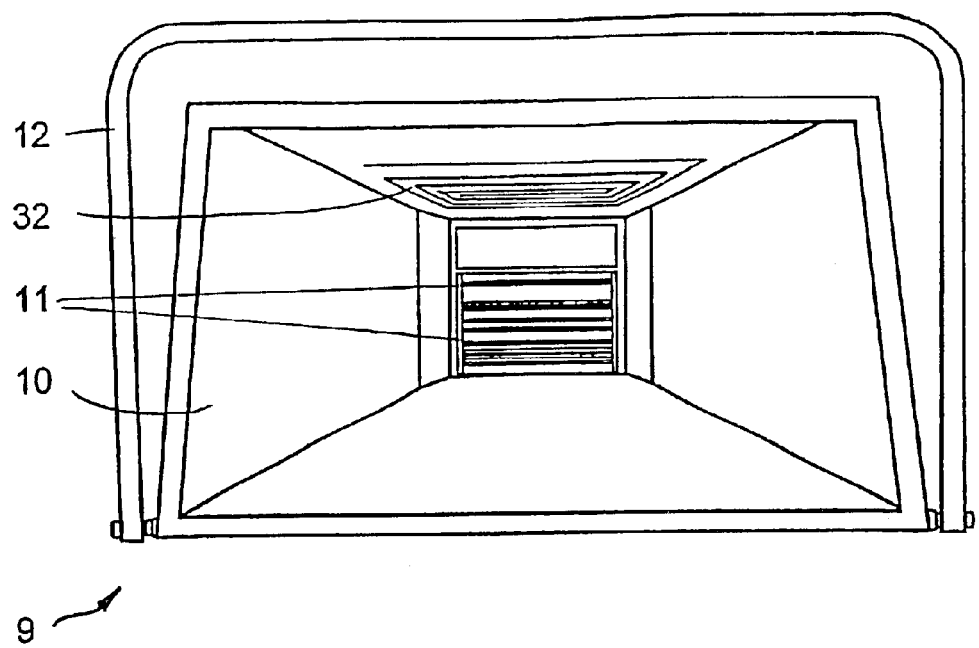
FIG. 6 is a front elevational view of a feed chute and feed rollers of a wood-chipping machine with a mounted sensing coil, according to an embodiment of the invention.
Figure 7:
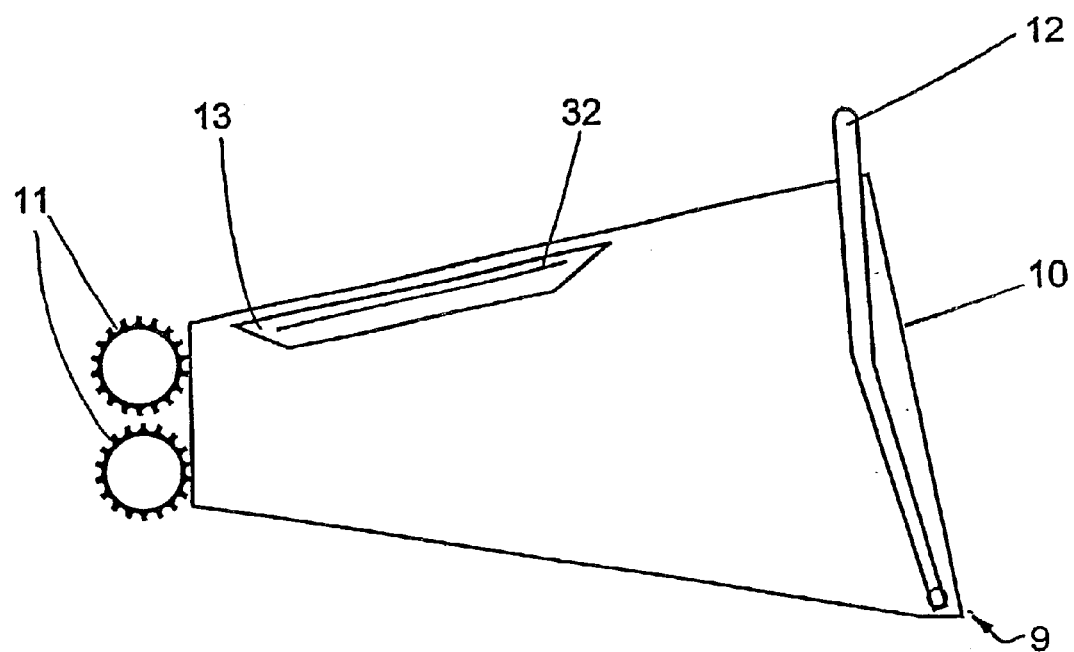
FIG. 7 is a side elevational view of the wood-chipping machine and mounted sensing coil of FIG. 6.

FIGS. 6 and 7 show the feed chute 10, two feed rollers 11 and a safety bar 12 of the wood-chipping machine 9. The feed rollers 11 control the feeding of branches or the like into the chipping blades of the machine 9. The sensing coil 32 is embedded in a truncated pyramid-shaped insulator matrix 13. The insulator matrix 13 mounts the sensing coil 32 to a wall of the chute 10 and insulates the sensing coil 32 from the wall of the chute 10.

Figure 3:
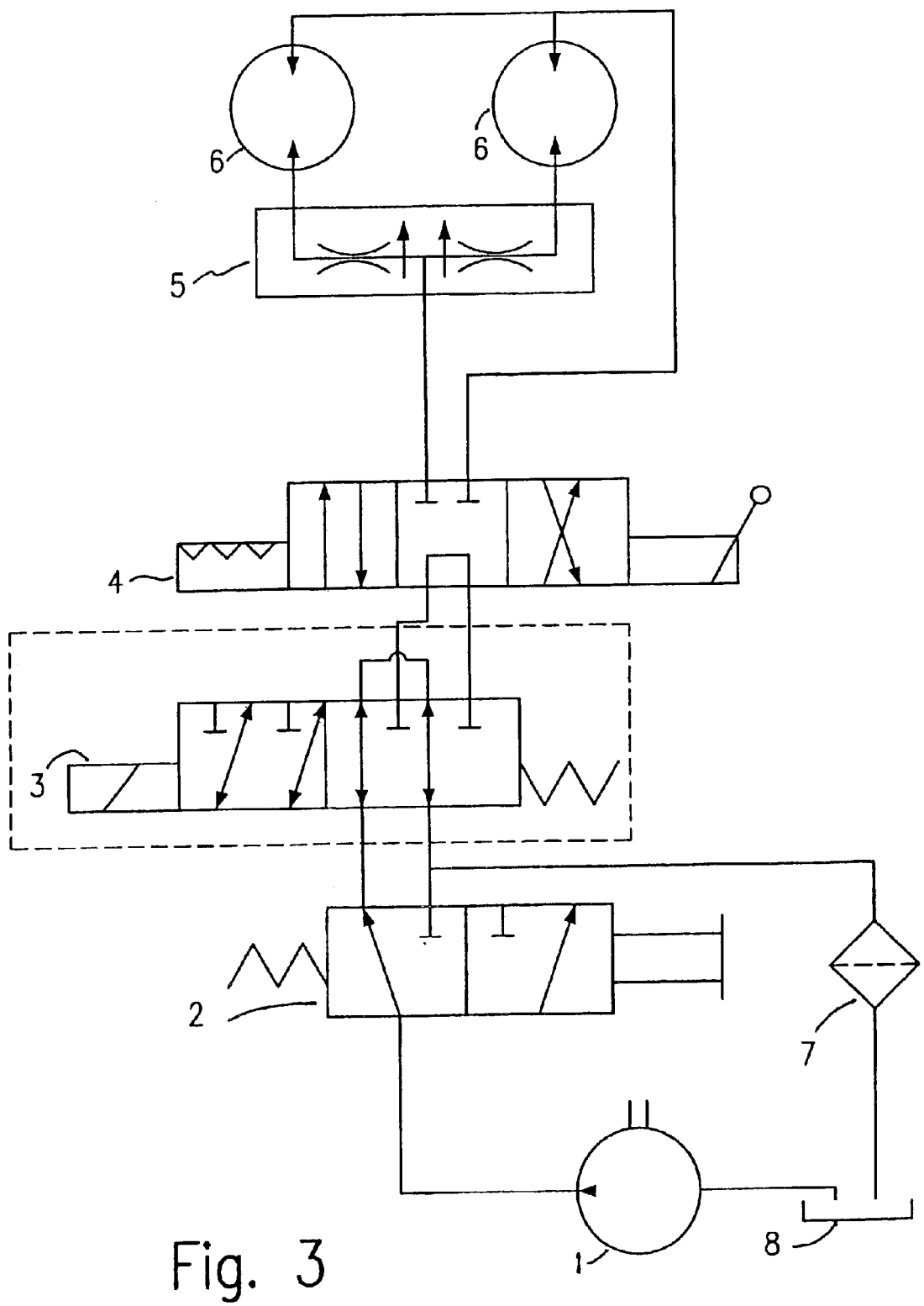
FIG. 3 is a hydraulic circuit diagram of a typical hydraulic circuit employed in a wood-chipping machine.

FIG. 3 shows a hydraulic pump 1 and a reservoir 8 for hydraulic fluid coupled to the pump. Feed valve 2, when in the position shown, allows the pump 1 to supply fluid to safety diverter solenoid valve 3. The valve 2 may be moved to its other position and in which case fluid from the pump is diverted to a return filter 7 and then fed back into the reservoir 8.

Safety diverter solenoid valve 3 includes a coil which, when energized, moves the valve from the position shown to its second position. In the position shown, fluid passes through valve 3 and is returned to the filter 7 and then to the reservoir 8 because the manual feed roller directional valve 4 is in its intermediate position.

The solenoid valve 3 is normally in the position shown when its associated coil is de-energized.

Feed roller directional valve 4 is manually operable and may be moved either to the left or to the right of its intermediate position. When valve 4 is moved to its left hand position fluid may be supplied to flow divider/combiner 5 and by that device to feed roller hydraulic motors 6 to cause the motors to drive the feed rollers 11 in a first direction. When the valve 4 is moved into its right hand position fluid may be supplied to the motors 6 via flow divider/combiner 5 to cause the rollers 11 to be driven in a direction opposite the first direction.

The safety solenoid valve 3 is normally energized and is de-energized whenever the hands of a machine operator, or another part of the operator's anatomy wearing passive sensor 20, are detected close to an area within the feed chute 10 of the wood-chipping machine 9 having sensing coil 32. When valve 3 is de-energized it returns to the position shown in FIG. 3 and motors 6 no longer rotate and the feed rollers 11 cease their rotation.

Figure 4:
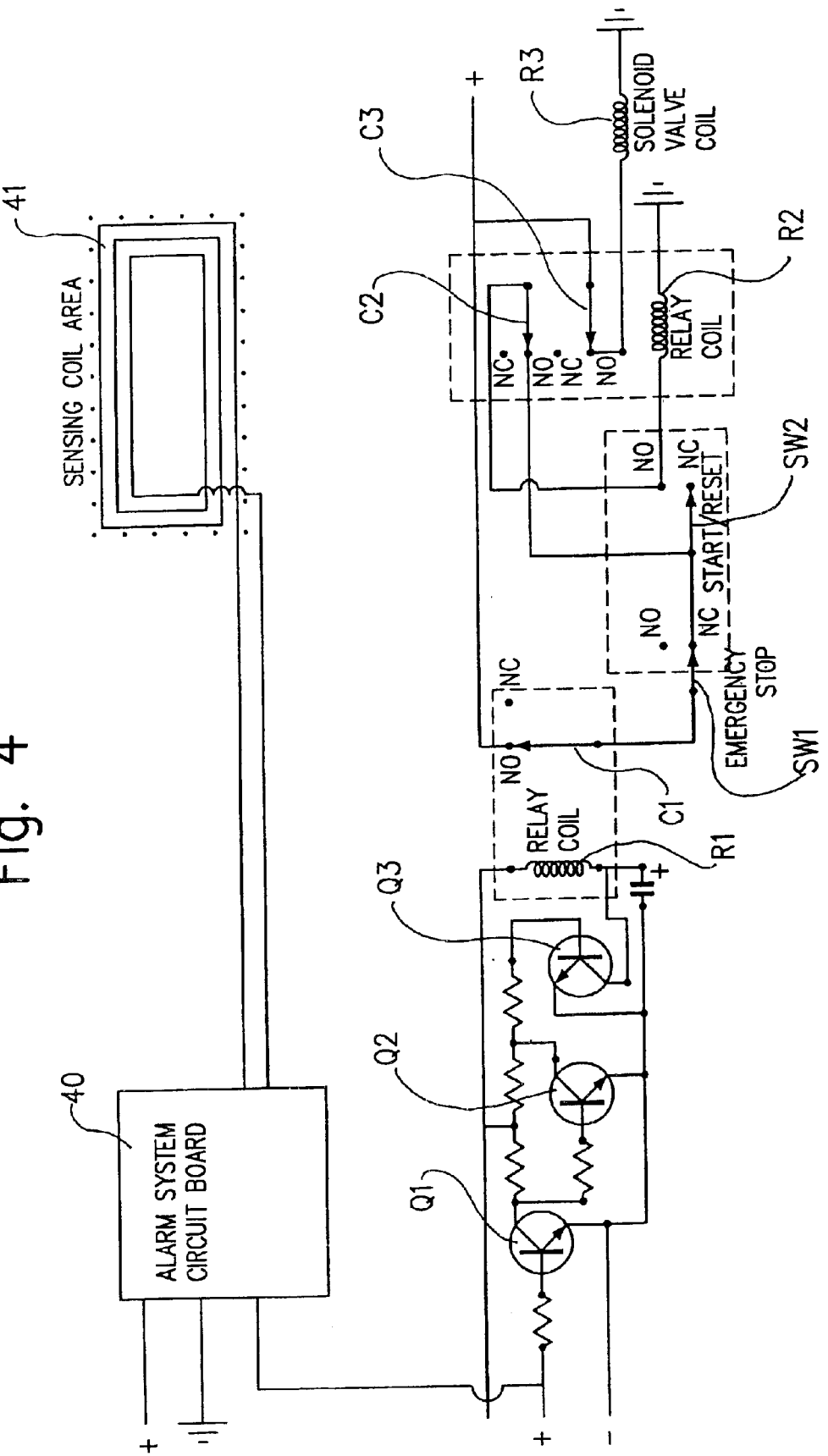
FIG. 4 is a circuit diagram showing further detail of part of the safety system of the material processing machine of the invention.

FIG. 4 shows further detail of part of the safety system of the material processing machine of the invention. Sensing coil 32, shown in FIG. 2 is coupled to alarm circuit 40 shown in FIG. 4. Coil 32 is positioned extending in a plane along the wall of the feed chute 10. The one or more passive sensor coils 21 worn by the machine operator function to modify the electromagnetic field produced by coil 32 whenever the passive sensor coils 21 are close enough to the sensing coil 32. This modification of the field of coil 32 is sensed by circuit 40, which provides an output as a consequence of this sensed proximity. With reference to FIG. 4, that output is used to drive a switching circuit consisting of transistors Q1, Q2 and Q3 and a relay having a coil R1 and a contact C1. With relay R1 de-energized, contact C1 is in the position shown.

An emergency stop switch SW1 is present in series with contact C1 and switch SW1 is normally closed.

A second relay has a coil R2 and two contacts C2 and C3. Contacts C2 and C3 are in the positions shown when relay coil R2 is energized. Coil R3 is the coil of solenoid valve 3 in FIG. 3. With FIG. 4 in the state shown, coil R3 is energized and the valve 3 in FIG. 3 is in its left hand position.

When coil 32 detects the proximity of a passive sensor coil, R1 is de-energized and contact C1 moves to its normally closed position. This de-energizes coil R2 and contacts C2 and C3 move to normally closed positions and coil R3 is de-energized. A start/reset switch SW2 is in series with emergency switch SW1. Once the passive sensors move away from coil 32 coil R1 is energized and contact C1 returns to the position shown in FIG. 4. Coil R2 is de-energized and contacts C2 and C3 are in the opposite (NC) positions to that shown in FIG. 4. Coil R3 is de-energized and the motors 6 (in FIG. 3), which drive the feed rollers 11, are not operating.

The start/reset switch SW2 is momentarily moved to the position opposite to that shown in FIG. 4 and thus allows coil R2 to be energized to move contacts C2 and C3 into the positions shown. The coil R3 is then energized and switch SW2 is released and returns to the position shown. Coil R2 is held in and coil R3 remains energized until coil 32 once again detects the proximity of a passive sensor.

Figure 5:
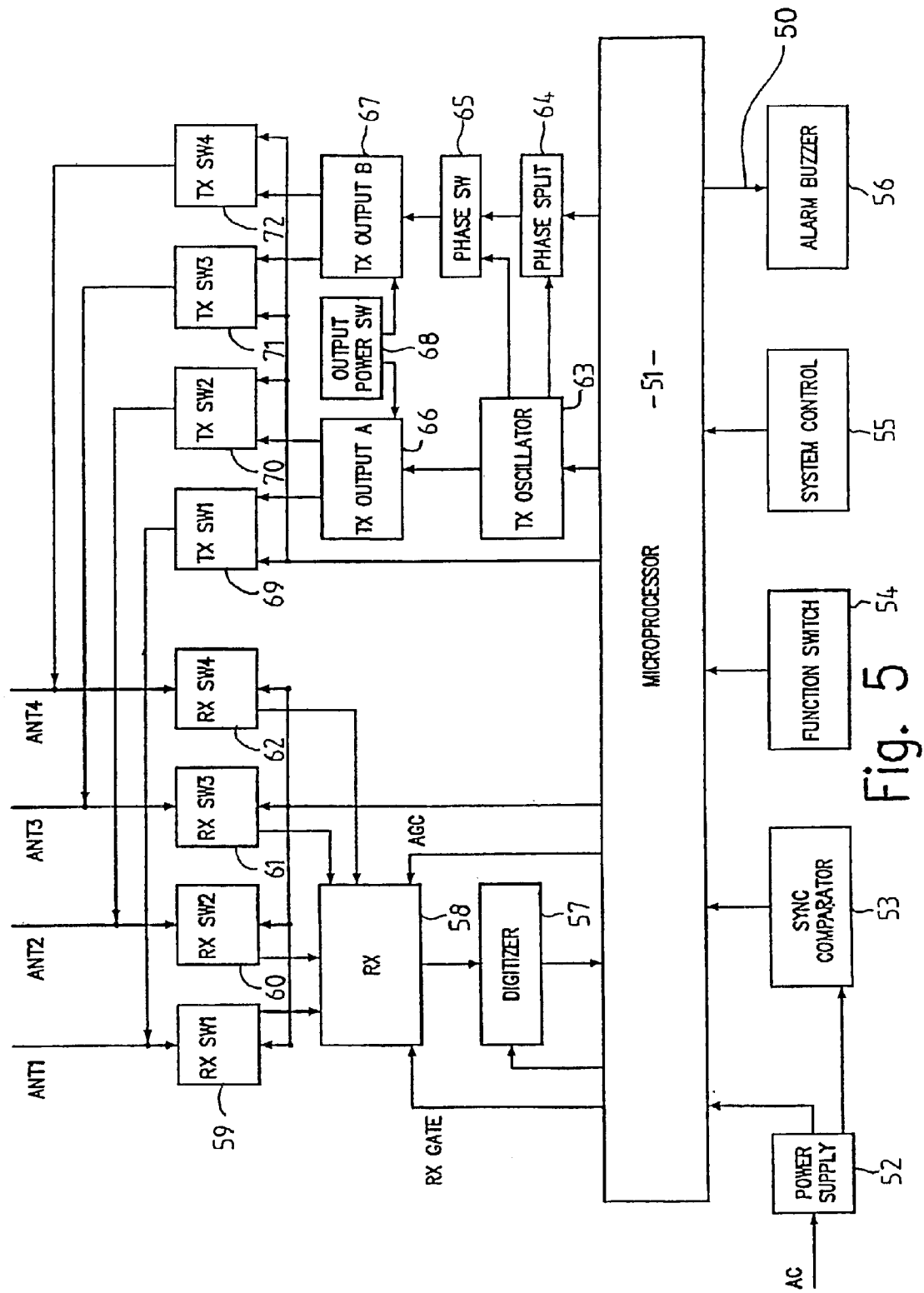
FIG. 5 is a detailed block diagram of a control circuit for the system shown in FIG. 4.

FIG. 5 shows a detailed circuit block diagram of an embodiment of a control circuit for the system of the invention. The circuit has four inputs ANT1, ANT2, ANT3 and ANT4 and only one of these is used. Coil 32 (FIG. 4) has one of its ends connected to input ANT1 and its other end is connected to ground. The circuit of FIG. 5 energizes the coil 32 and also monitors that coil to detect field changes in that coil produced by the proximity of a passive sensor. An output at line 50 may be used to operate an alarm and is the output supplied to transistor Q1 in FIG. 4.

The control circuit illustrated in FIG. 5 also includes a microprocessor 51, power supply 52, sync comparators 53, function switch 54, system control 55, alarm buzzer 56, digitizer 57, receiver 58, receive switches 59 to 62, transmitter oscillator 63, phase splitter 64, phase switch 65, first transmitter 66, second transmitter 67, output switch 68, and transmitter switches 69 to 72.

Figure 9:
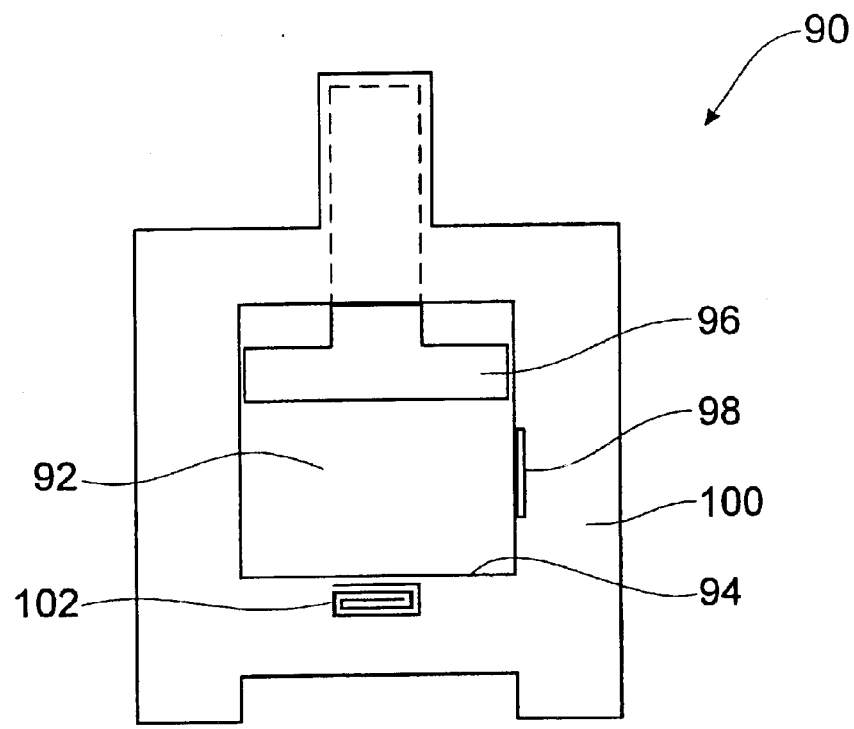
FIG. 9 is a front elevational view of an operating region, processing element and access region of a press with a mounted sensing coil according to a further embodiment of the invention.
Figure 10:
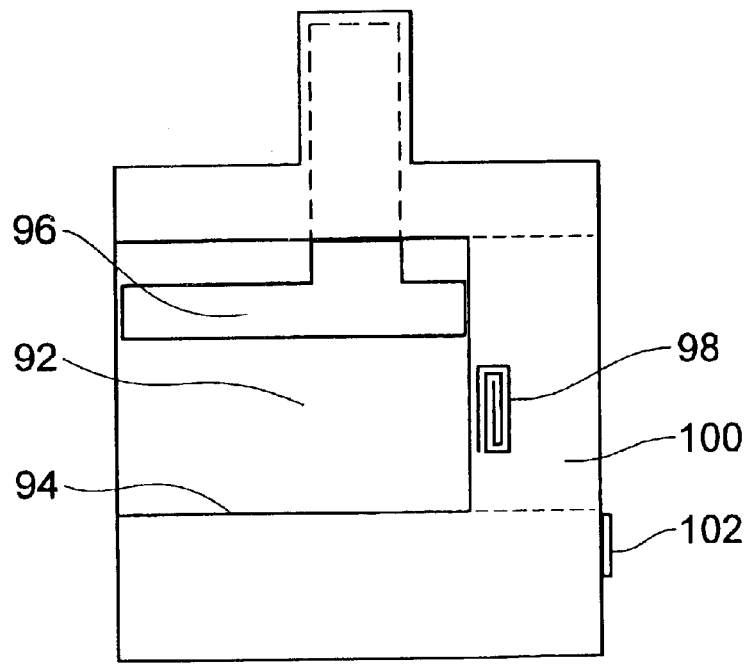
FIG. 10 is a side elevational view of the press of FIG. 9.

FIG. 9 shows another embodiment of the material processing machine of the present invention. FIG. 9 shows a schematic front elevational view of a press 90 having an operating region 92. Operating region 92 includes an anvil 94, on which material to be pressed is laid, and a processing element in the form of hydraulically driven blade 96. In accordance with the invention, a first sensing coil 98 is mounted to access region 100 and may be embedded in an insulator matrix, such as insulator matrix 13 described in reference to the embodiment above. One or more sensing coils may be mounted to any wall of access region 100.

When first sensing coil 98 detects the presence of a passive sensor 20 in access region 100, (a passive sensor being worn, for example, on one or preferably both wrists of an operator in the form of wristband 80), the press may be rendered temporarily inoperative by ceasing the hydraulically driven motion of blade 96. Preferably, first sensing coil 98 is positioned towards the rear of access region 100 adjacent operating region 92 to prevent an operator's hand entering operating region 92 whilst the press is operating. First sensing coil 98 may be tuned to detect when an operator's hand is parallel with the location of the sensing coil in access region 100. Hence, the safety system does not inhibit an operator from using the press in a normal manner, but prevents the operator from placing their hands in or dangerously close to operating region 92 whilst the press is operating.

A second sensing coil 102 may be mounted adjacent access region 100 to provide an interlock function that prevents material processing machine 90 being operated unless the operator is wearing the necessary passive sensors. In this embodiment, it would be sufficient for second sensing coil 102 to detect that an operator is wearing wristbands to allow the press 90 to operate. If the machine does not initially operate, an operator may be informed of the reason, such as via a "NO TAG" LED (not shown). This feature is described in more detail below with reference to the second wood-chipper embodiment.

Figure 11:
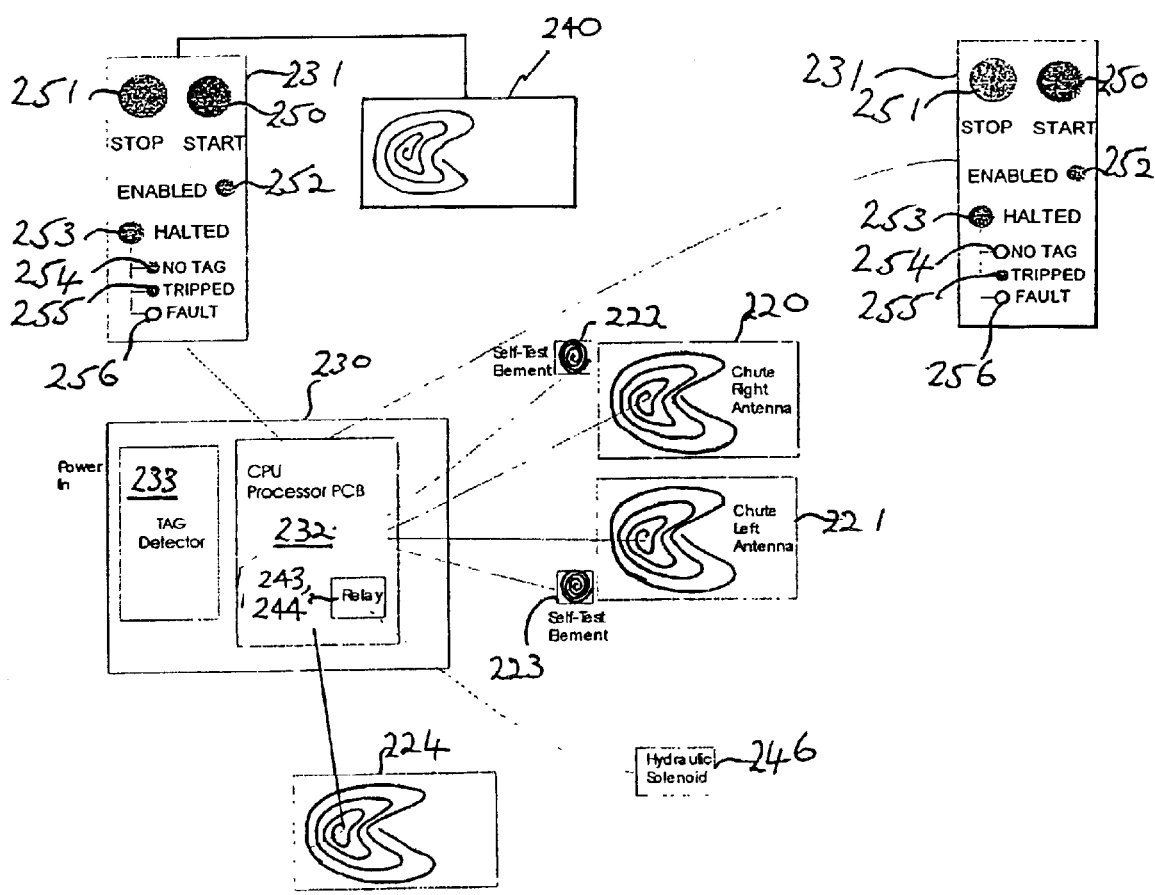
FIG. 11 is a block diagram of another embodiment of a wood-chipping machine incorporating a safety system.

Additionally, since some material processing machines are often foot operated, the operator may also wear one or two anklets having one or more passive sensors 20. In such a case, a dedicated sensing coil may be placed adjacent a foot control. Detection of the passive sensor 20 in the anklet by the dedicated sensing coil will be necessary to allow the material processing machine to be operated, thus providing an operation interlock. A yet further embodiment of the material processing machine of the present invention, also in the form of a wood-chipping machine, is illustrated in FIGS. 11–14. Referring to FIG. 11, the wood-chipping machine comprises first sensing coil 240, second sensing coils 220, 221 and third sensing coil 224. The wood-chipping machine also comprises control circuitry (FIG. 12) that is modified from that of the first embodiment of the wood-chipper described above.

First sensing coil 240 is mounted on or is integral with user interface 231. Sensing coils 220 and 221 each have a flat rectangular shape and are located in a feed chute 261 of a wood-chipping machine 260 shown in FIGS. 13 and 14. Sensing coil 220 is mounted to the inner right wall of the feed chute 261 while sensing coil 221 is mounted to the inner left wall of the feed chute 261. Each second sensing coil 220, 221 has a corresponding in-built test coil circuit 222, 223. Second sensing coils 220, 221 and test coil circuits 222, 223 are coupled to the control circuitry shown in FIG. 12.

Third sensing coil 224 is mounted to a flap 264 hinged to a lower side of the feed chute 261. Third sensing coil 224 has a similar configuration to first and second sensing coils 240, 220, 221 and is coupled to the control circuitry of FIG. 12.

Figure 13:
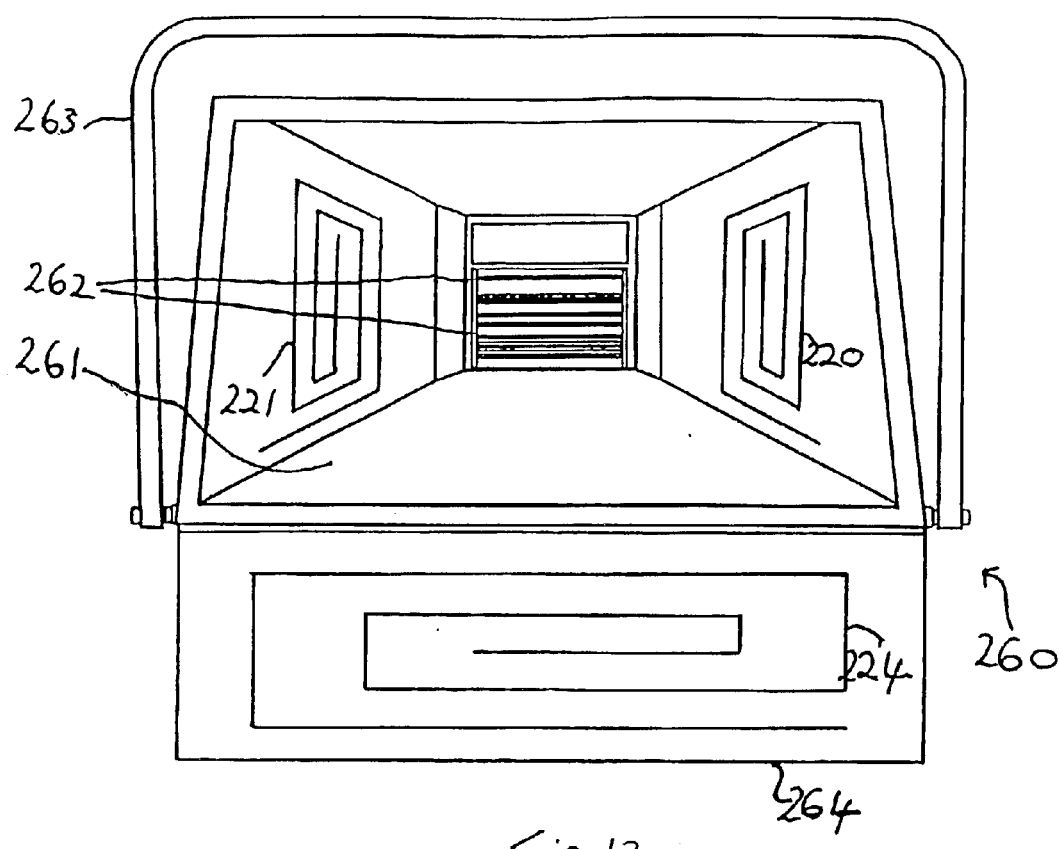
FIG. 13 is a front elevation of a wood chipping machine having a pair of sensing coils attached to the interior of a feed chute and a sensing coil mounted to a flap hinged to the feed chute according to an embodiment of the invention.
Figure 14:
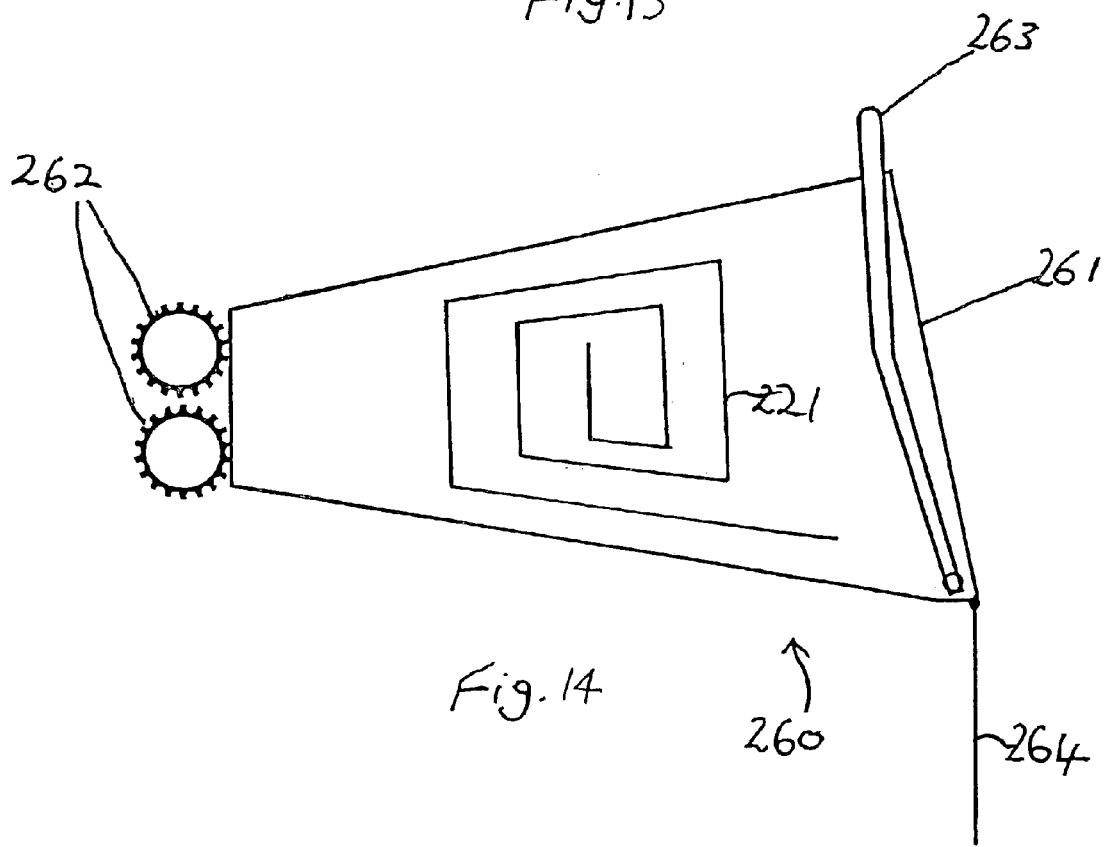
FIG. 14 is a side elevation of the wood-chipping machine of FIG. 13.

FIGS. 13 and 14 show the feed chute 261, two feed rollers 262 and a safety bar 263 of the wood-chipping machine 260. The feed rollers 262 control the feeding of branches or the like into chipping blades of the machine 260. The sensing coils 220, 221, 224 are each embedded in a truncated pyramid shaped insulator matrix, such as insulator matrix 13 described above and shown in FIG. 7. An insulator matrix mounts the second and third sensing coils 220, 221, 224 to the inner left and inner right walls of the chute 261 and the flap 264, respectively. The insulator matrix insulates the sensing coils 220, 221, 224 from the chute 261 and flap 264.

Figure 12:
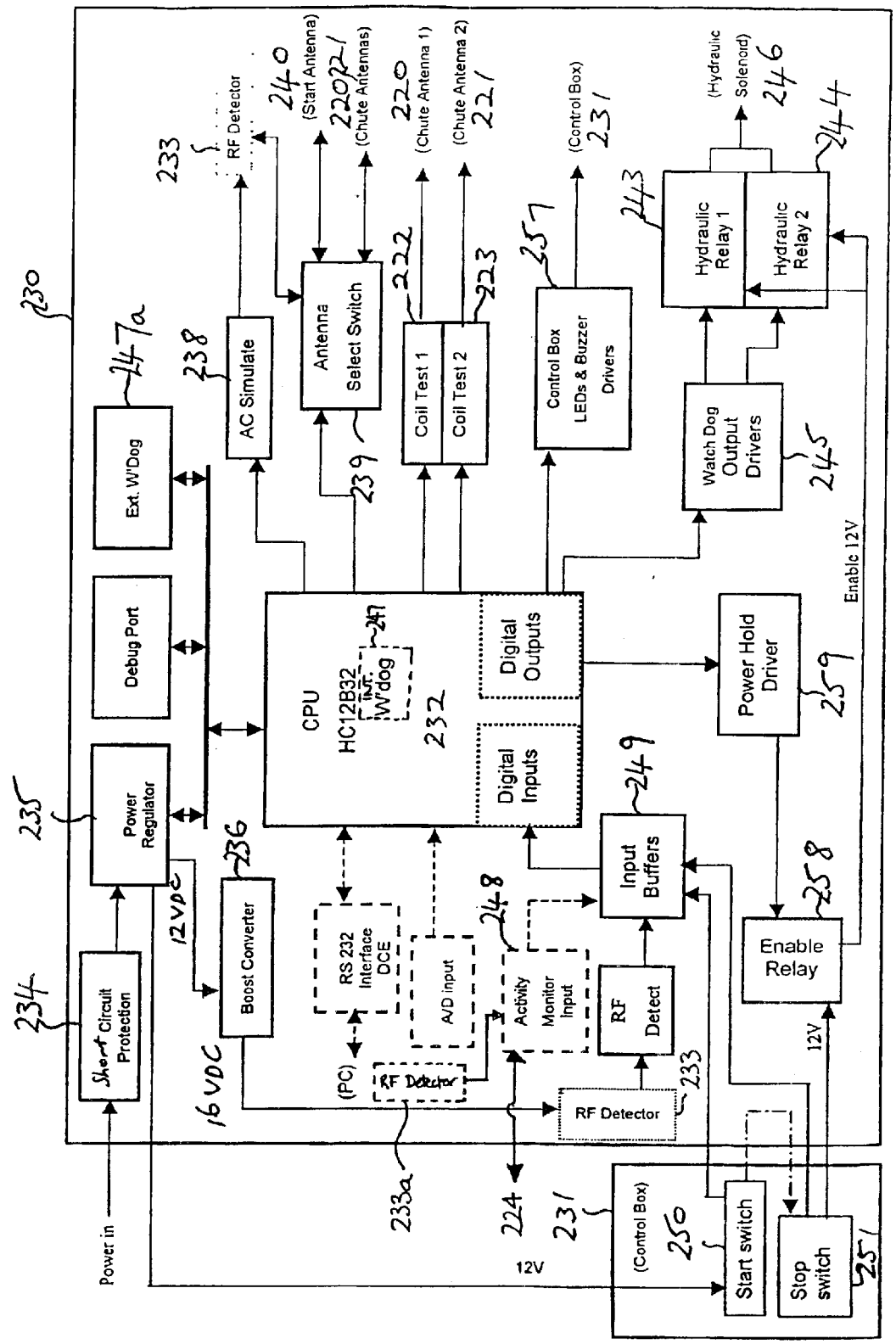
FIG. 12 is a block diagram of the control circuitry that forms part of the embodiment illustrated in FIG. 11.

Referring to FIGS. 11 and 12, the control circuitry includes a controller 230 coupled to at least one user interface 231. The controller 230 includes a processor 232 communicating with a first detector 233 and a second detector 233a. In a preferred form, the first detector 233 and the second detector are RF detectors. Electrical power is input to the controller 230 through a short circuit protection circuit 234, which in turn outputs the power to a power regulator 235. The power regulator 235 produces a regulated 12 VDC output to a boost converter 236 and the processor 232. The boost converter 236 also provides 16 VDC to the first detector 233.

The first detector 233 also requires an AC power supply. In this regard, the processor 232 controls an AC power generator 238 to generate a suitable 50 Hz power supply for powering the first detector 233. A coil select switch 239 is coupled to the first detector 233. The processor 232 controls the switch 239 to couple either a first sensing coil 240 or the second sensing coils 220, 221 to the first detector 233. The first sensing coil 240, which forms part of a corresponding user interface 231, has a similar configuration to second and third sensing coils 220, 221, 224. The first detector 233 is configured to detect when a passive sensor 20 is proximal to either the first sensing coil 240 or the second sensing coils 220, 221. Stated differently, the first detector 233 is configured to detect when a passive sensor 20 is proximal to a user interface 231 or in the feed chute 261. If the first detector 233 detects a passive sensor 20 this information is communicated to the processor 232.

Test coil circuits 222 and 223 are controlled by the processor 232. Each test coil circuit 222, 223 is operable to test the operation of a corresponding second sensing coil 220, 221.

The second detector 233a is coupled to an activity monitor input 248 of the controller 230. The activity monitor input 248 is coupled to the processor 232 by an input buffer 249. The second detector 233a is similar to the first detector 233 and is also powered in a similar manner to the first detector 233. The second detector is configured to detect when a passive sensor 20 is proximal to the third sensing coil 224. Stated differently, the second detector 233a is configured to detect when a passive sensor 20 is proximal to the flap 264. If the second detector detects a passive sensor 20 this information is communicated to the processor 232.

The processor 232 controls a pair of relays 243, 244 through a relay driver 245. Relays 243, 244 are operable to connect the 12 VDC regulated power supply from the power regulator 235 to a hydraulic solenoid 246 associated with the wood-chipping machine 260. Connecting the 12 VDC regulated power supply to the hydraulic solenoid 246 causes the feed rollers 262 of the wood-chipping machine 260 to rotate. The relays 243, 244 can only be energized if a watchdog detects that the processor 232 is operating correctly. The watchdog includes an internal watchdog 247 of the processor 232 and an external watchdog 247a for added security. The external watchdog 247a is coupled to the processor 232. The internal watchdog 247 or the external watchdog 247a de-energize the relays 243, 244 in the event that the processor 232 stops processing. De-energizing the relays 243, 244 has the effect of disconnecting the 12 VDC power supply from the hydraulic solenoid valve 246 which causes the feed rollers 262 of the wood chipping machine 260 to stop rotating.

Each user interface 231 has a start switch 250, a stop switch 251, an "ENABLED" LED 252, a "HALTED" LED 253, a "NO TAG" LED 254, a "STRIPPED" LED 255, a "FAULT" LED 256 and a buzzer (not shown). The LEDs and the buzzer are coupled to the processor 232 via drivers 257.

The stop switch 251 is of the Normally Closed (NC) locking safety type. The stop switch 251 is in line with the regulated 12 VDC power supply so that, when the stop switch 251 is pressed, the 12 VDC power supply is disconnected from the relays 243, 244.

The start switch 250 is of the Normally Open (NO) momentary contact type. A first terminal of the start switch 250 is connected to the regulated 12 VDC output from the power regulator 235. If the start switch 250 is pressed, the regulated 12 VDC power supply is momentarily supplied to the stop switch 251. This has the effect of energizing an enable relay 258 (which forms part of the controller 230) so that the regulated 12 VDC power supply is input to the relays 243 and 244. A power hold driver 259 enables the processor 232 to maintain the enable relay 258 in the energized state after the start switch 250 is released. The enable relay 258 remains energized as long as the stop switch 251 is not pressed or as long as the power hold driver 259 is enabled by the processor 232.

The operation of the third embodiment of the material processing machine, in the form of a wood chipper, will now be described with reference to FIGS. 11 to 14.

During start-up, controller 230 performs a self-test to test the operation of the first detector 233 and the second sensing coils 220, 221. The processor 232 controls the coil select switch 239 to couple the second sensing coils 220, 221 to the first detector 233. The processor 232 enables the test coil circuit 222 to resonate and checks for a valid detect signal from the first detector 233 indicating that the second sensing coil 220 has detected the resonating test coil circuit 222. If the processor 232 receives a valid detect signal from the first detector 233, the processor 232 disables the test coil circuit 222 and enables the test coil circuit 223 to resonate. The processor 232 then checks for a valid detect signal from the first detector 233 indicating that the second sensing coil 221 has detected the resonating test coil circuit 223. While the self-test is being conducted, the processor 232 causes the "HALTED" LED 253 to flash so as to indicate that the self-test is in progress. If any of the second sensing coils 220, 221 fails to be detected, the processor 232 activates the "FAULT" LED 256. If the start switch 250 is pressed while the "FAULT" LED 256 is activated the self-test is repeated. The system 210 will not progress beyond the self-test operation unless the self-test is successfully completed.

If the self-test is successfully completed the processor 232 activates the "HALTED" LED 253 and controls the coil select switch 239 to couple the first sensing coil 240 to the first detector 233.

If the start switch 250 is pressed and the first detector 233 detects that a passive sensor 20 is proximal to the first sensing coil 240, which would happen if, for example, a band 80 having a plurality of passive sensors 20 embedded therein is worn around an operator's wrist and is adjacent the first sensing coil 240, and the second detector detects that a passive sensor 20 is proximal to the third sensing coil 224, which would happen if, for example, a band 80 having a plurality of passive sensors 20 embedded therein is worn around an operator's ankle and is adjacent the third sensing coil 224, the processor 232 interprets this as a valid start command. However, if the start switch 250 is pressed and the first detector 233 does not detect that a passive sensor 20 is proximal to the first sensing coil 240 or the second detector does not detect that a passive sensor 20 is proximal to the third sensing coil 224, the processor 232 interprets this as an invalid start command and activates the "NO TAG" LED 254.

If a passive sensor 20 has been detected as being proximal to the first sensing coil 240 for more than five seconds and the start switch 250 is pressed after this five second period, the processor 232 interprets this as an invalid start command and will activate the "NO TAG" LED 254.

Upon receiving a valid start command, the previously described self-test of the second sensing coils 220, 221 and first detector 233 is repeated. However, during this second self-test the processor 232 causes the "ENABLED" LED 252 to flash. Upon passing the second self-test the processor 232 causes the "ENABLED" LED 252 to stay activated. Also, the processor 232 controls the coil select switch 239 so that the sensing coils 220, 221 are coupled to the first detector 233. Further, the processor 232 energizes the relays 243, 244 so that the feed rollers 262 of the wood-chipping machine 260 begin operating. If the internal watchdog 247 or the external watchdog 247a detect that the processor 232 has stopped operating the watchdogs de-energize the relays 243, 244 so as to disable the hydraulic solenoid valve 246 and stop the feed rollers 262 from operating. During the time that the feed rollers 262 are operating, the first detector 233 monitors the second sensing coils 220, 221 and the second detector monitors the third sensing coil 224. If the first detector 233 detects a passive sensor 20 the first detector 233 signals the processor 232. If the second detector detects the presence of a passive sensor the second detector signals the processor 232. Upon being signalled by the first detector 233 or upon determining that a signal has not been received from the second detector for at least a predetermined period of time, the processor 232 deactivates the relay driver 245 and de-energizes the relays 243, 244, which disables the hydraulic solenoid valve 246 and causes the feed rollers 62 to stop operating. The processor 232 also deactivates the "ENABLED" LED 252 and activates the buzzer, "HALTED" LED 253 and "TRIPPED" LED 255. If the presence of a passive sensor 20 was detected by the first sensor 233, the machine cannot be restarted unless the passive sensor 20 is removed from the feed chute 261 and the stop switch 251 is pressed.

Pressing the stop switch 251 at any time causes the regulated 12 VDC power supply to be disconnected from the relays 243, 244. Also, the processor 232 disables the power hold driver 259.

The use of passive sensors 20, which do not require power, means that the machine operator need not carry a power supply and this gives rise to operational advantages, such as preventing the safety system from becoming inoperative if a power supply fails. Additionally, the safety system can be operated in hot, dusty, metallic and/or vibrating environments, which is not always possible with prior art safety systems, such as light curtains and infrared systems. Furthermore, the continuous monitoring of the work environment, and in particular the environment in close proximity to dangerous areas, makes it difficult for operators to injure themselves with the material processing machine of the present invention.

The invention has been described by way of example initially with reference to its use with a wood-chipping machine 9. In the first embodiment, solenoid valve 3 in FIG. 3 is necessary to ensure that drive to the feed rollers 11 is discontinued.

It will be appreciated that the material processing machine of the invention could be a machine other than the examples described herein. Activation of the material processing machine may only be achieved when the required passive sensor(s) are detected and deactivation of at least one aspect of operation of the machine is achieved when the presence of an operator or part thereof in a danger area is detected by virtue of the at least one passive sensor.

The invention is not limited to stopping the operation of a machine altogether when the presence of a passive sensor is detected in a danger zone. Alternatively, the response to such detection may be to instead stop a feed system of a machine or to cause a safety gate or the like to block access to a danger zone of a machine, such as the operating region of a machine. A warning klaxon or the like may also be sounded.

The safety system of the invention could back up existing emergency stop buttons conventionally fitted to machines. Rather than relying on the immediate response and quick action of an alert operator to activate the emergency stop, the invention is able to stop the machine automatically in the event of a hand or foot or the like being detected in a danger area as described above.

Furthermore, the inventors envisage that the present invention is not limited to the detection of operators' body parts carrying the passive sensors and the invention could comprise the detection of other undesired objects in a danger zone such as the operating region of a machine.

Throughout the specification the aim has been to describe the invention without limiting the invention to any one embodiment or specific collection of features. Persons skilled in the relevant art may realize variations from the specific embodiments that will nonetheless fall within the scope of the invention.

What is claimed is:

1. A material processing machine comprising:
    an operating region having at least one processing element in which material is processed by the at least one processing element;
    an access region having at least one sensing coil, material passing to said operating region via the access region;
    motive means driving the at least one processing element; and
    control circuitry responsive to a signal from the at least one sensing coil to control at least one aspect of operation of the machine, wherein the at least one sensing coil generates the signal when at least one passive sensor carried by a user of the machine is in the access region.

2. The machine of claim 1 wherein the at least one passive sensor is a tuned circuit.

3. The machine of claim 2 wherein the tuned circuit consists of a coil and a capacitor connected in parallel with one another.

4. The machine of claim 3 wherein the coil has a number of turns wound in a spiral to present a substantially flat shaped circular coil.

5. The machine of claim 1 wherein the at least one passive sensor is worn by the user of the machine.

6. The machine of claim 1 wherein the at least one passive sensor is incorporated in at least one item which is placed around a part of the user's body which may enter the access region.

7. The machine of claim 6 wherein the at least one item is one or more bands worn around the wrist(s) and/or ankle(s) of the user.

8. The machine at claim 6 wherein the at least one item is one or more glove(s) worn on the hand(s) of the user.

9. The machine of claim 1 wherein the at least one sensing coil is insulated from the machine.

10. The machine of claim 1 wherein the at least one sensing coil is placed in the access region adjacent parts of the machine capable of injuring the user.

11. The machine of claim 1 wherein:
    the at least one sensing coil is energized by the control circuitry;
    an electromagnetic field generated by the at least one sensing coil is modified by the close proximity of the at least one passive sensor; and in response to detection of the field modification, the control circuitry provides a control signal to control at least one aspect of the operation of the machine.

12. The machine of claim 1, wherein the control circuitry provides a start signal in response to a first sensing coil detecting proximity of at least one passive sensor.

13. The machine of claim 12 wherein the start signal permits starting of the machine, but does not commence operation of the machine.

14. The machine of claim 12 wherein the machine commences operation if a machine starting means is activated by the user while the start signal is provided by the control circuitry.

15. The machine of claim 12 wherein the first sensing coil is located adjacent a user interface which controls the machine.

16. The machine of claim 1, wherein, in response to at least one second sensing coil detecting at least one passive sensor in the access region, the control circuitry provides a control signal to the motive means to cease operation of the at least one processing element.

17. The machine of claim 1 wherein, in response to at least one second sensing coil detecting at least one passive sensor in the access region, the control circuitry provides a control signal to block access to the operating region of the machine.

18. The machine of claim 1, wherein the control circuitry provides a control signal in response to a third sensing coil not detecting a passive sensor for a predetermined period of time.

19. The machine of claim 18, wherein the control signal ceases operation of at least part of the machine.

20. The machine of claim 1 further comprising at least one self-test element to determine if the at least one sensing coil is operating correctly.

* * * * *